United States Patent [19]

Orsborn et al.

[11] Patent Number: 4,947,628
[45] Date of Patent: Aug. 14, 1990

[54] MULTIPLE ROW COTTON HARVESTER

[75] Inventors: Jesse H. Orsborn, Hinsdale; Michael J. Covington, LaGrange, both of Ill.

[73] Assignee: J. I. Case Company, Racine, Wis.

[21] Appl. No.: 320,074

[22] Filed: Mar. 3, 1989

[51] Int. Cl.⁵ .......................................... A01D 46/08
[52] U.S. Cl. ...................... 56/13.5; 56/15.5; 56/28
[58] Field of Search ............... 56/13.5, 15.5, 28, 40, 56/41, 44; 111/69; 172/645, 649, 667, 673

[56] References Cited

U.S. PATENT DOCUMENTS

| Re. 32,699 | 6/1988 | Fachini | 56/44 |
|---|---|---|---|
| 4,249,365 | 2/1981 | Hubbard et al. | 56/28 X |
| 4,722,173 | 2/1988 | Covington et al. | 56/28 X |
| 4,803,830 | 2/1989 | Junge et al. | 56/28 |

Primary Examiner—William P. Neuder
Attorney, Agent, or Firm—Dressler, Goldsmith, Shore, Sutker & Milnamow, Ltd.

[57] ABSTRACT

A multiple row cotton harvester machine having a plurality of harvesting units and a system for individually mounting the harvesting units at a front end of the cotton harvester. The mounting system includes a lift arm assembly which is adapted for vertical movement with respect to the frame of a harvesting machine. The harvesting units are individually connected to the lift arm assembly in a manner allowing the harvesting units to be pivotally moved relative to each other between first and second positions about a substantially vertical axis and in a generally horizontal direction to provide access for servicing or to effect wider row cotton harvesting operations.

14 Claims, 6 Drawing Sheets

FIG_3

MULTIPLE ROW COTTON HARVESTER

FIELD OF THE INVENTION

This invention generally relates to cotton harvesting machines and, more particularly, to a system for mounting and supporting at least two individual harvesting units in a side-by-side relationship on a frame of a cotton harvesting machine for pivotal displacement in a generally horizontal direction relative to each other to widen the sidewise or lateral spacing between the harvesting units.

BACKGROUND OF THE INVENTION

Conventional self-propelled cotton harvesters utilize individual harvesting units mounted at a front end of the cotton harvester. Each harvesting unit defines a plant passage and typically includes two cotton picker rotors comprised of numerous circularly driven picker bars. Each picker bar mounts a plurality of rotatably driven, radially extending picker spindles for removing the cotton from the plant.

A pair of doffer assemblies along with a picker spindle moistening assembly are typically provided in combination with the harvesting unit. Each doffer assembly, having numerous rotatably driven doffer pads, is provided to remove the cotton from the individual picker spindles. The picker spindle moistening assembly includes a series of vertically arranged moistening pads for adding moistening fluid to each of the cotton picker spindles before they are introduced to cotton plants.

Although considerable design effort has resulted in cotton harvesting units of reduced size and weight, the intended usage and required operation of such units dictates a relatively large sized mechanism having considerable weight. Because of their relatively large structure, arranging the individual harvesting units on a cotton harvester for picking narrow rows of cotton has been a continuing source of difficulty.

Cotton harvester machines having up to four individual harvesting units arranged in side-by-side relationship relative to each other have been designed to increase cotton picker production. To allow for picking of adjacent, narrowly spaced rows of cotton it is known to arrange one harvesting unit closely adjacent another harvesting unit such that the spacing between adjacent plant passages substantially corresponds to the narrow spacing between cotton rows.

Complete servicing of the harvesting units which are so arranged is difficult and time consuming because of the limited accessibility between harvesting units. To remove an inboard harvesting unit for servicing usually requires removal of the adjacent outboard harvesting unit. Simultaneous removal of both harvesting units causes problems due to the bulkiness and weight of the separate harvesting units. Moreover, removal of the outboard harvesting unit before the removal of the inboard harvesting unit takes additional time, a premium during the harvest season.

SUMMARY OF THE INVENTION

In view of the above, and in accordance with the present invention, there is provided a multiple row cotton harvester having at least two individually mounted harvesting units. The pair of harvesting units are mounted on the harvesting machine in such a manner as to allow at least one of the harvesting units to be pivotally moved sidewise in a generally horizontal direction relative to the other harvesting unit to widen the sidewise relationship between the harvesting units thereby enhancing access to the units without requiring complete removal of either unit from the machine.

More specifically, the harvesting machine of the present invention includes a main frame which is supported by a pair of wheeled axles. First and second individual harvesting units are supported at a forward end of the main frame in an adjacent or side-by-side relationship relative to each other. Each harvesting unit defines a fore-and-aft plant passage and includes a first picker rotor with a rotational axis and a second picker rotor with a rotational axis. Preferably, the axes of the first and second picker rotors are arranged on opposite sides of the plant passage.

The cotton picker harvesting units are preferably mounted in aligned side-by-side relationship on an elongated lift arm which is connected to the frame of the machine. The harvesting units are individually connected to the lift arm in a manner permitting pivotal displacement or movement of at least one harvesting unit in a sidewise direction between first and second positions. A selectively operated mechanism releasably holds the harvesting units in either first or second positions. In one position, the mechanism maintains the plant passages generally parallel to each other yet allows the harvesting units to be shifted sidewise relative to each other to the other position.

The lift arm, with the harvesting units mounted thereon, is pivotally connected to the main frame of the machine. To control the vertical disposition of the harvesting units relative to the frame, a hydraulic cylinder is pivotally connected between the vehicle frame and the lift arm. The operative length of the hydraulic cylinder controls the angular displacement of the lift arm and thereby the vertical disposition of the harvesting units relative to the frame of the machine.

In a modified form of the present invention, two lift arms are pivotally connected to the frame of the machine. One or more of the harvesting units are connected to one lift arm and the remaining harvesting units are individually connected to the other lift arm. Each of the lift arms has a hydraulic cylinder which controls the angular displacement of the lift arm and thereby the vertical disposition of the harvesting units connected thereto. As will be appreciated, the provision of two lift arms facilitates independent vertical adjustment of the harvesting units relative to the frame of the machine.

The present invention is advantageous over other cotton harvesting systems by providing a mechanism for connecting the harvesting units to the frame such that one or more of the harvesting units can be pivotally moved in a horizontal direction relative to an adjacent harvesting unit. The mechanism for connecting the harvesting units to the frame includes a saddle bracket which slips over the lift arm and is easily connected thereto. Each saddle bracket includes a generally vertical pivot tube embraced at opposite ends by upper and lower supports connected to each harvesting unit. The pivot tube defines a substantially vertical axis about which the harvesting unit is pivotally moved.

To aid in preventing the harvesting units from digging into the ground when encountering uneven field conditions, the present invention further includes a mechanism for independently setting the tilt of each harvesting unit. The mechanism for adjusting the tilt of each harvesting unit includes a tension tube plate which is pivotally connected to the lift arm. The end of the tension tube plate generally opposite the lift arm is connected by a rearwardly extending tension link to the frame of the harvesting machine. A radius rod connects the forward end of the harvesting unit to the tension tube plate. The effective length of the radius rod, which is adjustable, individually sets the tilt of each harvesting unit.

To facilitate an increase in cotton picking production, a second or outer pair of harvesting units may be further connected to the lift arm in side-by-side relation with the other pair of harvesting units. Each harvesting unit of the second pair of harvesting units is individually connected to the lift arm in a manner allowing pivotal displacement thereof between first and second positions. The mechanism for individually connecting each harvesting unit of the second pair of harvesting units to the frame is substantially similar to that described above.

A mounting system according to the present invention readily facilitates independent mounting of a plurality of harvesting units to a forward end of the harvesting machine and provides for relatively narrow spacing between the harvesting units. While the harvesting units of the cotton harvester may be arranged in a first position to facilitate narrow row cotton harvesting, the structure of the present invention permits the harvesting units to be pivotally moved in a horizontal direction with respect to each other to enhance accessibility for purposes of servicing.

Other features and advantages of the present invention will become readily apparent from the following detailed description, appended drawings, and accompanying claims.

DETAILED DESCRIPTION OF THE PRESENT INVENTION

While the present invention is susceptible of embodiment in various forms, there is shown in the drawings preferred embodiments of the invention which are hereinafter described, with the understanding that the present disclosure is to be considered as an exemplification of the invention, and is not intended to limit the invention to the specific embodiments illustrated.

Referring now to the drawings, wherein like reference numerals indicate like parts throughout the several views, there is shown a self-propelled cotton harvesting machine which is depicted only fragmentarily and is seen as represented in its entirety by reference numeral 10. The cotton harvesting machine 10 has a mobile main frame 12 mounted on a pair of ground engaging front wheels 14. A pair of steerable rear wheels (not shown) provide the harvester with proper direction.

Arranged forwardly of the frame 12 are a plurality of individual cotton picker harvesting units 20, 22, 24, 26, and 28. As illustrated, the harvesting units are arranged in a side-by-side relationship for harvesting parallel and adjacent rows of cotton. It should be appreciated, however, that this invention equally applies to a lesser number of harvesting units than that illustrated.

In a preferred form of the invention, each of the harvesting units is substantially similar in structure. Accordingly, only a description of harvesting unit 20 will be provided with the understanding that the other harvesting units are similarly structured.

Figure 2:
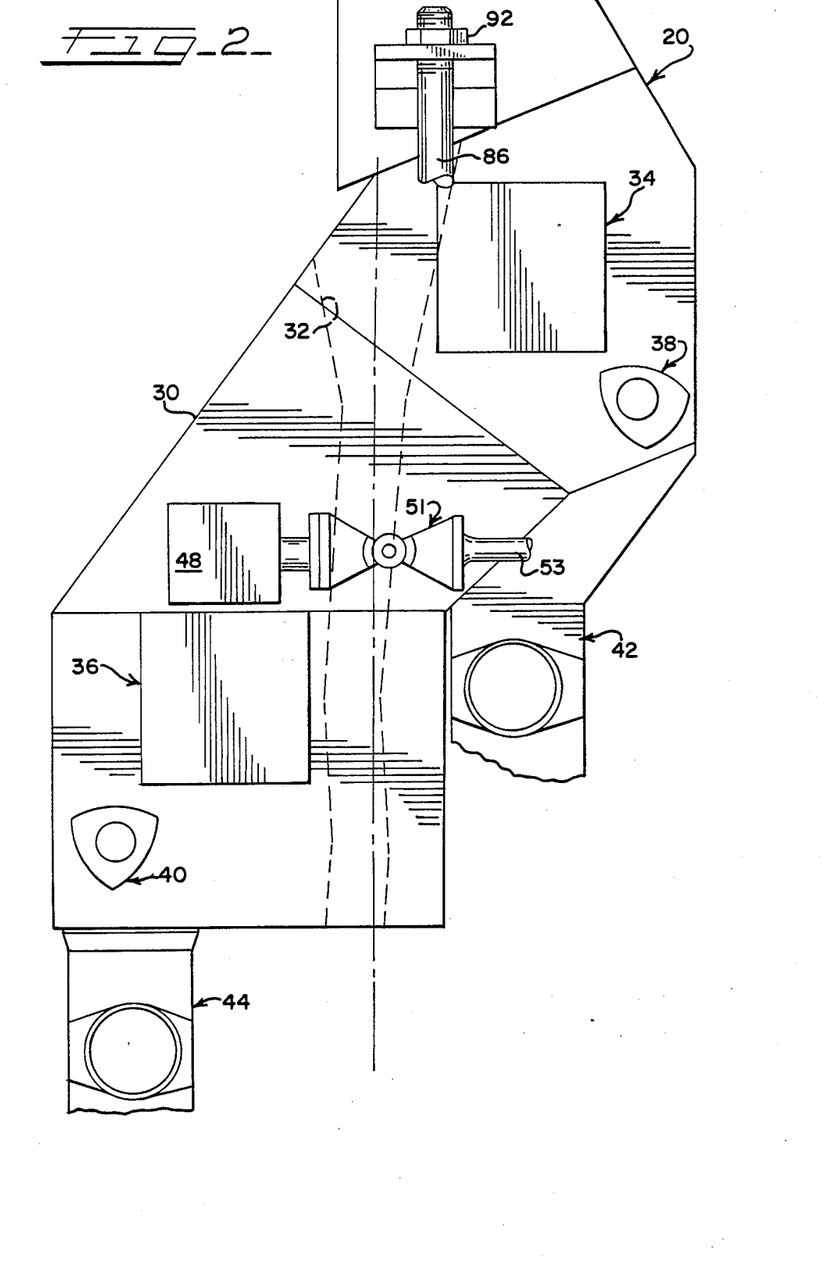
FIG. 2 is a top plan view showing the general construction of a single harvesting unit.

Turning to FIG. 2, each harvesting unit includes a housing assembly 30 defining a fore-and-aft crop-receiving opening or plant passage 32. Each harvesting unit further includes front and rear spindle rotors 34 and 36 which, in a preferred embodiment, are transversely separated by the fore-and-aft plant passage 32. Adjacent the spindle rotors 34 and 36 are conventional upright doffer assemblies 38 and 40 which remove cotton from picking spindles on the spindle rotors 34 and 36. Conventional upright discharge assemblies 42 and 44 are provided near the doffer assemblies 38 and 40, respectively. The discharge assemblies receive cotton removed from the spindle rotors 34 and 36 by the doffers 38 and 40 and direct same through upright openings in the rear of the units. Cotton conveying ducts (not shown) direct the cotton from the discharge assemblies into a basket (not shown) on the machine or other suitable receptacle.

The picker rotors 34 and 36 and the doffer assemblies 38 and 40 are driven by a conventional drive assembly. As illustrated, such a drive assembly includes a bevel gear transmission mounted in a gear housing 48 preferably arranged at an upper end of each housing assembly 30.

The drive assemblies of adjacent harvesting units are interconnected such that power and torque from an input drive shaft 49 (FIG. 1) is transmitted to the harvesting units while permitting sidewise displacement thereof without loss of power. In a preferred form, illustrated in FIG. 1, a telescopic shaft assembly 51 interconnects adjacent gear housings 48. Each shaft assembly 51 preferably includes a conventional universal joint provided at opposite ends of telescopically splined shafts 53 and 55.

A lift arm assembly, indicated generally at 56, is provided for mounting the harvesting units 20 through 28 to the forward end of the frame 12. In the illustrated embodiment, harvesting units 20 and 28 define an outboard pair of harvesting units. Harvesting units 22 and 26 define an inboard pair of harvesting units. Preferably, harvesting unit 24 is fixedly secured between harvesting units 22 and 26.

Figure 1:
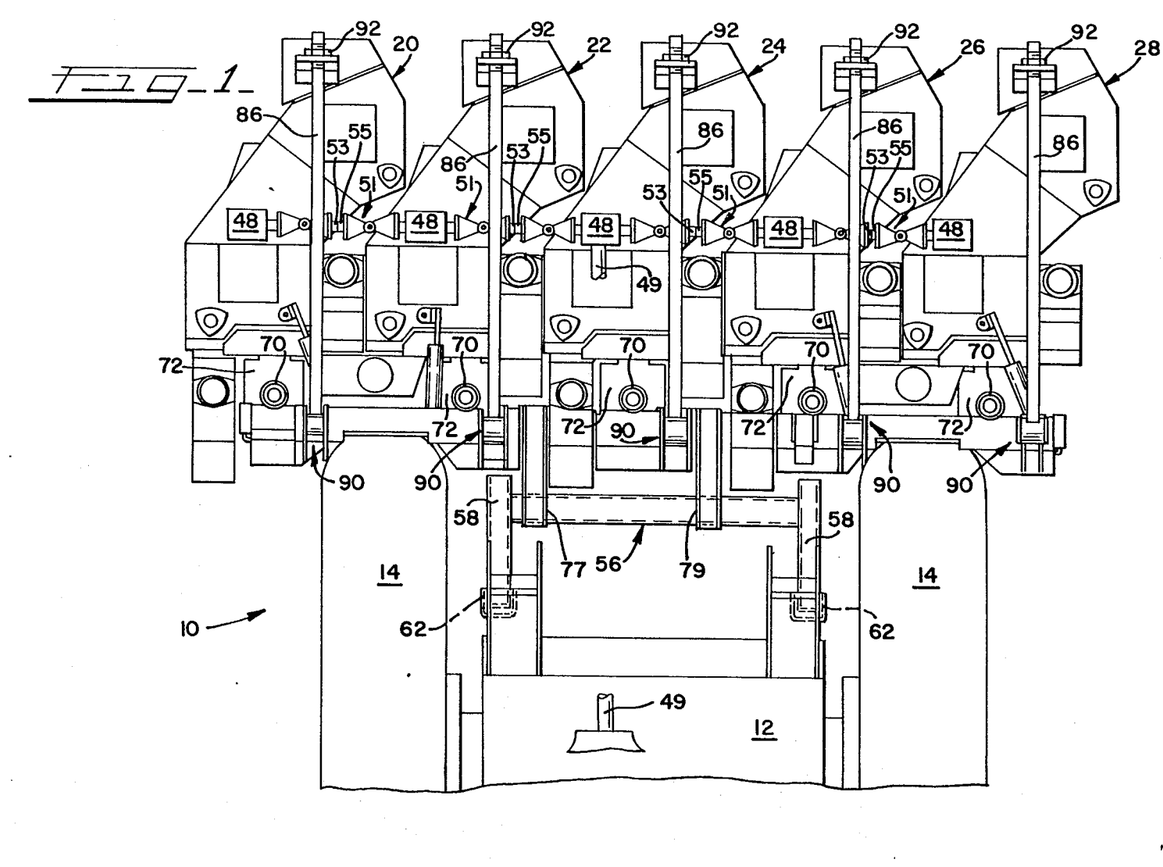
FIG. 1 is a partial top plan view of a cotton harvester illustrating a harvesting unit configuration for harvesting narrow row cotton.
Figure 3:
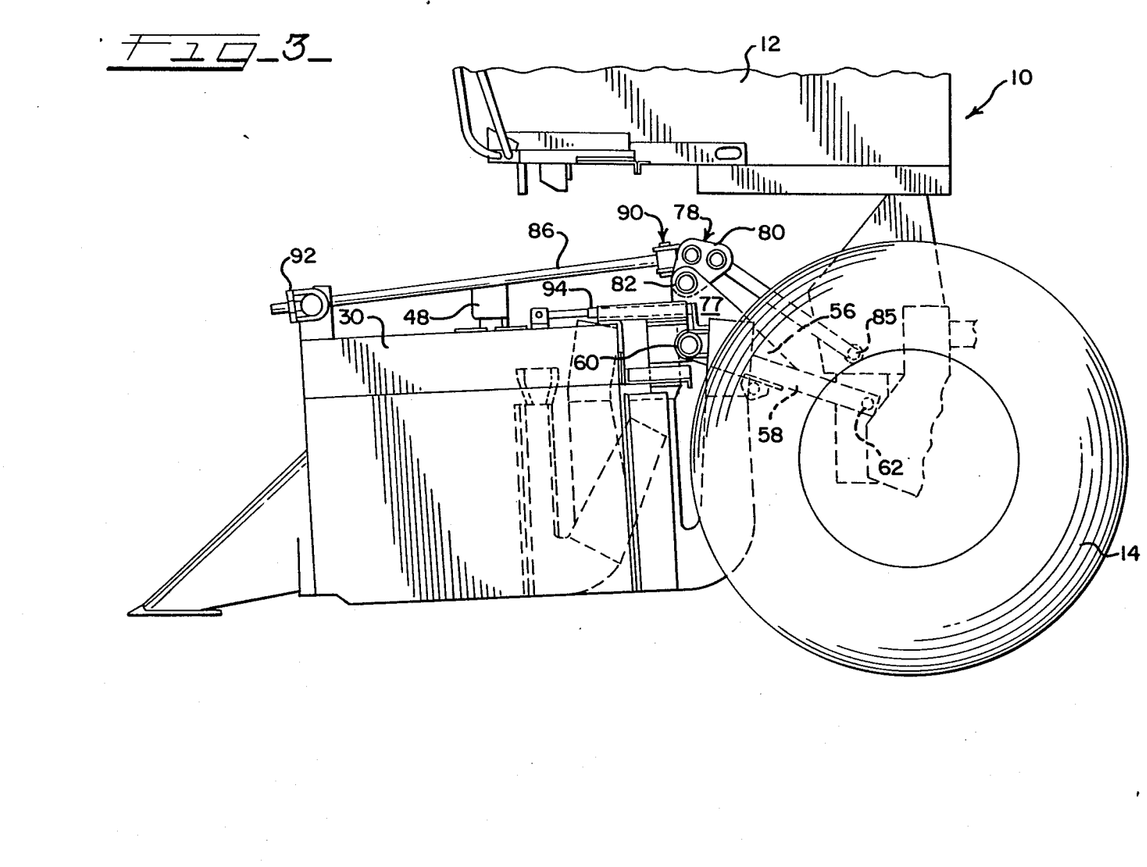
FIG. 3 is a partial side elevational view illustrating a harvesting unit supported from a frame of a cotton harvester.

As seen in FIGS. 1 and 3, the lift arm assembly 56 includes a pair of rearwardly extending arms 58 which are pivotally connected to frame 12 as at point 62. The lift arm assembly further includes a lift arm tube 60 which is vertically movable about point 62. The lift arm tube 60 extends laterally across and behind each of the harvesting units. (Note: Through this application the term "tube" is used generally referring to structural members, and such structural members need not be tubular but may be other shapes as structural members.)

Figure 4:
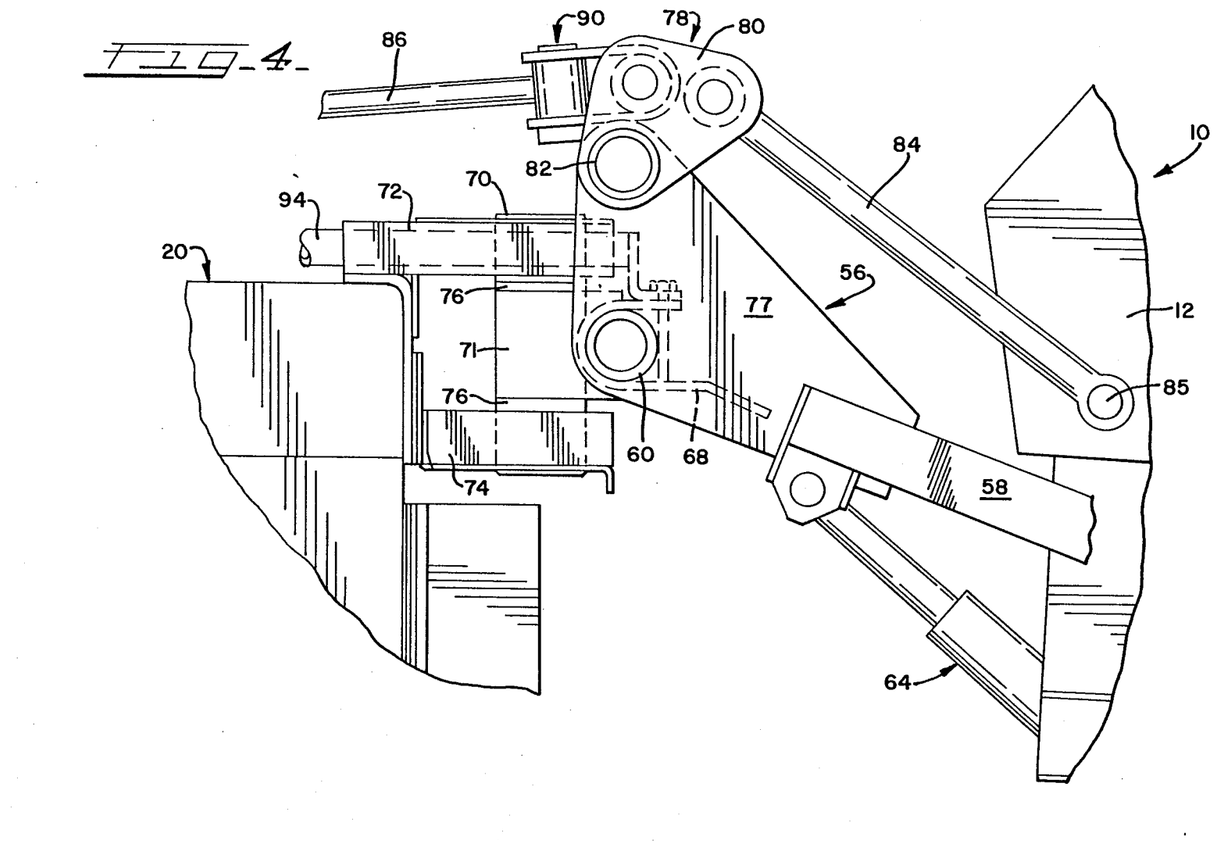
FIG. 4 is an enlarged fragmentary side elevational view of a mounting arrangement for a harvesting unit according to the present invention.

Turning to FIG. 4, the angular position of lift arm assembly 56 and, thereby, the vertical disposition of the harvesting units connected thereto, is controlled by driver 64 operatively associated with the lift arm assembly 56. In its preferred form, driver 64 includes a linearly distendable cylinder ram which is pivotally connected at one end to frame 12 of the machine 10 and its other end is connected to the lift arm 56. The operative or effective length of driver 64 controls the vertical disposition of lift arm assembly 56 and thereby the vertical disposition of the individual harvesting units 20 through 28.

The harvesting units 20 through 28 are individually connected to the lift arm assembly 56. Each harvesting unit is provided with a support mechanism which provides quick and ready assembly and disassembly of the harvesting unit to the frame of the machine. Because each support mechanism for each individual harvesting unit is substantially the same, only the support mechanism associated with harvesting unit 20 will be described in detail, with the understanding that the other support assemblies are similarly constructed.

Figure 5:
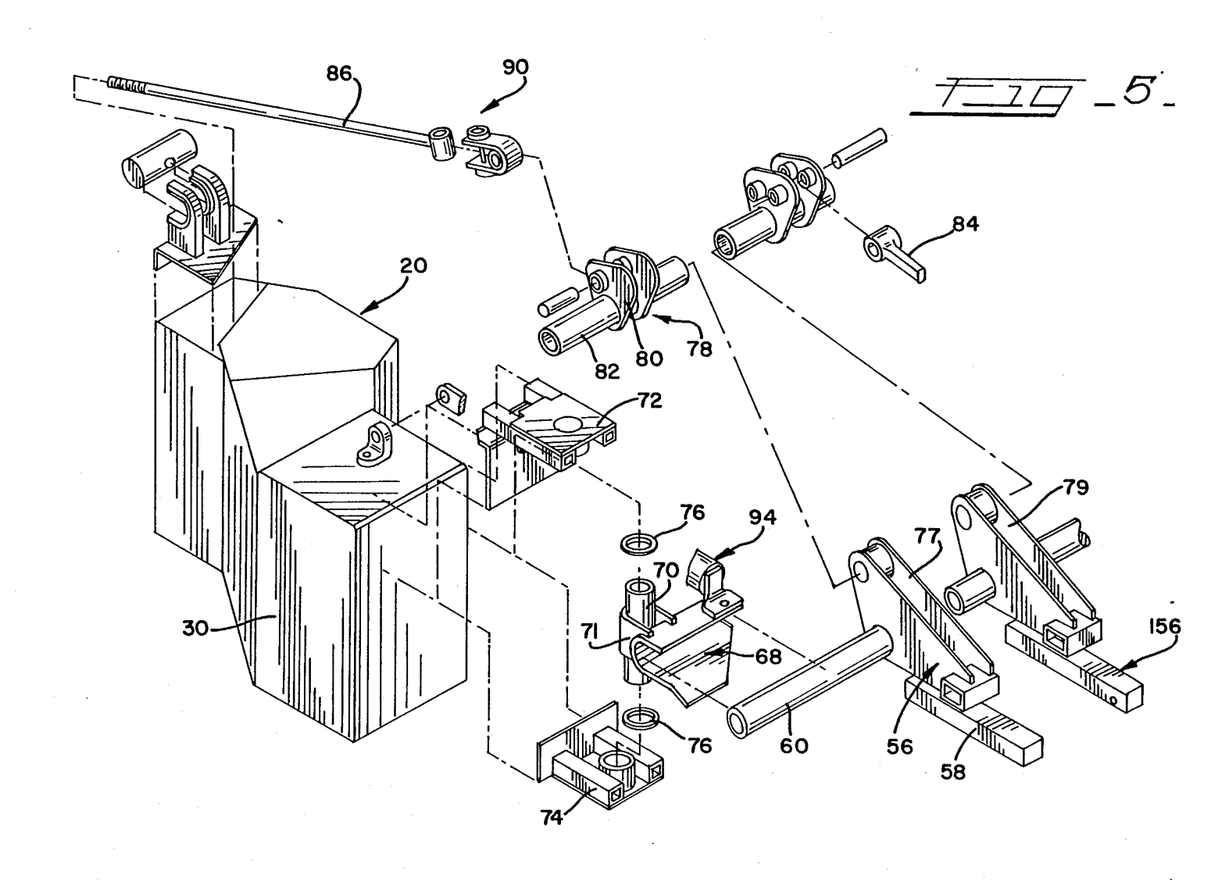
FIG. 5 is a modified form of the present invention.

Turning to FIGS. 4 and 5, each support mechanism includes a saddle bracket 68 which slips or slides over the lift arm tube 60. A generally vertical pivot tube 70 including a support 71 is connected to the saddle bracket 68. The pivot tube 70 defines a substantially vertical axis about which the respective harvesting unit pivotally moves in a horizontal direction. A horizontal cantilevered upper support arm 72, which is connected to a rear portion of the harvesting unit, fits over the upper end of the pivot tube 70. A horizontal cantilevered lower support arm 74 which is likewise connected to a rear portion of the harvesting unit, fits over the lower end of the pivot tube. Support arms 72 and 74 allow the harvesting units to pivot about the axis of pivot tube 70. To reduce friction and wear, a washer or thrust bearing 76 is provided between each support arm 72, 74 and the vertical tube support 71.

Each harvesting unit is provided with a mechanism for setting the angular position or tilt of the associated harvesting unit relative to the frame 12. An upper arm assembly 78 provides a common support for each tilt adjustment mechanism. Since each tilt adjustment mechanism is substantially similar to the other only the tilt adjustment mechanism associated with harvesting unit 20 will be discussed in detail with the understanding that the other mechanisms are substantially similar.

As best illustrated in FIG. 4, the upper arm assembly 78 includes an laterally elongated torsion tube 82 extending parallel with and which is pivotally supported above lift arm tube 60. In the illustrated embodiment, a pair of fabricated sleeves 77 and 79 (FIG. 1), which are part of the lift arm assembly 56, pivotally support tube 82 above tube 60. Each tilt adjustment mechanism includes a tension plate 80 which extends from and is fixedly attached to torsion tube 82. At its upper end, plate 80 is pivotally connected to a rearwardly extending rigid tension link 84. The opposite end of link 84 is articulately connected to the frame 12 of the machine 10 as at 85. Extending forwardly from tension plate 80 is a tension link or radius rod 86. One end of the radius rod is connected to the plate 80 as by a universal joint 90 which permits both vertical and horizontal movements of the radius rod 86.

Returning to FIGS. 2 and 3, the opposite end of the radius rod 86 is connected to the forward end of the associated harvesting unit. As illustrated, the forward end of the radius rod 86 is threaded and, by use of a jam nut 92, the effective length of the radius rod 86 may be adjusted to effect the tilt of the harvesting unit. Since the adjustment apparatus is located in front of the harvesting unit, tilt adjustment can be easily made in the field. Another advantage of this arrangement is that the tilt of each harvesting unit may be made independent of the other harvesting units.

Turning to FIG. 5, each harvesting unit is provided with a selectively operated mechanism which facilitates positioning of a pivotally mounted harvesting unit in either first or second positions. When the harvesting unit is in a first position, the plant passages of adjacent harvesting units extend generally parallel relative to each other. When the harvesting units are in a second position, the harvesting units have a wider spacing therebetween.

In a preferred embodiment, the selectively operated mechanism for positioning each pivotal harvesting unit includes a driver 94 such as a linearly distendable electrohydraulic cylinder ram having one end pivotally attached to the respective saddle bracket 68 mounting a harvesting unit and its other end pivotally attached to the housing assembly 30 of the respective harvesting unit which it is meant to position. Selective distention and retraction of driver 94 controls the pivotal position of the associated harvesting unit about its vertical axis.

FIG. 5 illustrates an additional lift arm assembly 156 provided adjacent to lift arm assembly 56. Lift arm assembly 156 may be structured and connected to frame 12 in a substantially similar manner to lift arm assembly 56. The addition of lift arm assembly 156 allows one or more harvesting units to be connected to one lift arm assembly and the remaining harvesting units to be connected to the other lift arm assembly. The addition of a second lift arm assembly allows some of the harvesting units to be separately lifted from the remaining group of harvesting units.

When the machine is being driven from one location to another, harvesting units 20 through 28 are preferably carried in a raised position. By distending driver 64, lift arm assembly 56 is moved in a raised or transport position. Because the individual harvesting units are each connected to the lift arm assembly 56, they too are vertically raised into a transport position.

In preparation for harvesting, the lift arm assembly 56 is pivoted downwardly under the influence of driver 64. Downward movement of the lift arm assembly 56 results in the harvesting units carried thereon being lowered. The ultimate vertical position of the harvesting units is controlled by automatically adjusting the operative or effective length of the driver 64. After attaining the proper vertical disposition of the harvesting units, the machine 10 is ready for operation.

It is often necessary, for effecting service of the harvesting unit components, that the lateral or sidewise spacing between the individual harvesting units be increased. The present invention permits attainment of such ends by pivotally moving the harvesting units about their respective vertical axis defined by pivot tube 70. The universal joint 90, of each tilt adjustment mechanism allows each harvesting unit to be moved or pivoted left or right of center in a generally horizontal direction while maintaining suitable vertical support therefore.

Figure 6:
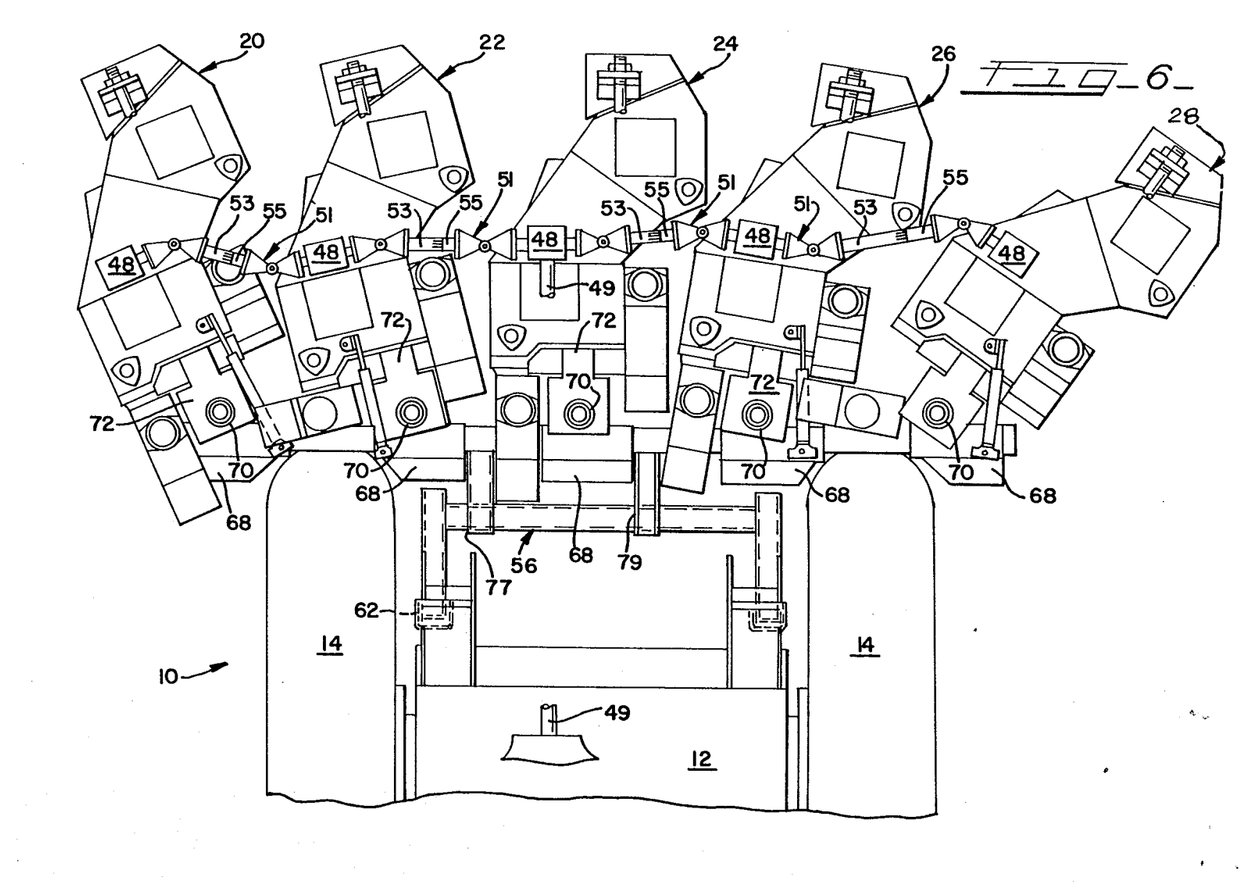
FIG. 6 is a top plan view similar to FIG. 1 illustrating the harvesting units in sidewise spaced relation relative to each other.

As illustrated in FIG. 6, each harvesting unit may be individually moved in a horizontal direction and releasably retained in a second position to facilitate access to the harvesting units. It should be appreciated that the method of pivoting the harvesting units between first and second positions can be performed manually (by pushing the harvesting units from one position to the other), mechanically (as with a hand crank and screw thread) or in the preferred method using a power-assisted driver such as 94. The automatic driver arrangement described in detail above is preferred in that it provides easy control and is convenient and that it could be operated from a cab portion of the cotton picker unit.

To reduce the amount of debris drawn into the individual harvesting units during operation, adjustment of the jam nut 92 regulates the effective length of the tension rod 86 in a manner properly positioning each individual harvesting unit relative to the ground.

In those cotton harvester arrangements wherein two or three harvesting units are mounted in a side-by-side relationship, the pivotal displacement of the harvesting units relative to each other would furthermore facilitate harvesting of wider rows of cotton without requiring timely and exhausting rearrangement of the individual harvesting units on the lift arm assembly. With the present invention, and when arranged in a first position, the harvesting units could be arranged to harvest narrow rows of cotton. When pivoted to their second position, the harvesting units would be arranged to harvest wider rows of cotton. Of course, the ability to alternate between narrow and wide cotton row harvesting operations depend on the lateral spacing between the adjacent cotton rows and the lateral positioning of the vertical axes of the various harvesting units relative to the lift arm assembly.

From the foregoing, it will be observed that numerous modifications and variations can be effected without departing from the true spirit and scope of the novel concept of the present invention. It will be appreciated that the present disclosure is intended as an exemplification of the invention, and is not intended to limit the invention to the specific embodiment illustrated. The disclosure is intended to cover by the appended claims all such modifications as fall within the scope of the claims.

What is claimed is:

1. A multiple row cotton harvester comprising:
a mobile main frame;
an elongated lift arm pivotally attached to said frame for vertical movement relative thereto;
first and second cotton harvesting units arranged forwardly of the main frame in a side-by-side lateral relationship relative to each other, each harvesting unit defining a fore-and-aft plant passage and includes first and second picker rotors; and
means for individually connecting each of said harvesting units to said frame, said individual connecting means including pivotal means defining a generally vertical axis about which said first harvesting unit is pivotally moved relative to said second harvesting unit for widening the lateral relationship between the harvesting units and thereby facilitating access therebetween.

2. The multiple row cotton harvester according to claim 1 further including means for releasably holding said first and second harvesting units such that the respective plant passages extend generally parallel relative to each other during operation of the cotton harvester.

3. The multiple row cotton harvester according to claim 1 further including drive means connected to said lift arm for controlling angular displacement of said lift arm and thereby the vertical displacement of said harvesting units.

4. The multiple row cotton harvester according to claim 1 further including a mechanism for adjusting the fore-and-aft disposition of the harvesting units, said mechanism including a plate pivotally attached to said lift arm, a first tension link pivotally connecting said plate with said main frame, and a second tension link attached at one end to said plate and attached at its other end to one of the harvesting units whose fore-and-aft disposition is to be adjusted.

5. The multiple row cotton harvester according to claim 4 wherein said second tension link includes means for adjusting the effective length of said link and thereby defining the tilt of said harvesting unit to which it is connected.

6. A multiple row cotton harvester comprising:
a mobile main frame;
first and second cotton harvesting units each harvesting unit defining a plant passage for receiving rows of cotton; and
means for supporting said first and second harvesting units forwardly of the main frame in side-by-side lateral relation relative each other, said supporting means including a lift arm mounted on said main frame for vertical movement relative thereto, and means for individually connecting each of said harvesting units to said lift arm, said individual connecting means including pivotal means defining a generally vertical axis about which at least said first harvesting unit is pivotally moved in a lateral direction relative to said second harvesting unit between first and second positions to facilitate access between the harvesting units.

7. The multiple row cotton harvester according to claim 6 wherein said pivotal means about which said first harvesting unit is pivotally moved includes a saddle bracket connected to said lift arm and having a generally vertical pivot tube embraced at opposite ends by upper and lower supports connected to said first harvesting unit, said pivot tube defining the substantially vertical axis about which said first harvesting unit pivotally moves.

8. The multiple row cotton harvester according to claim 6 further including operative means for releasably holding said harvesting units such that the plant passages extend generally parallel to each other during operation of the cotton harvester.

9. The multiple row cotton harvester according to claim 6 further including operative means for releasably holding said first harvesting unit in said first position during operation of the cotton harvester and for selectively driving said first harvester unit to its second position to widen the sidewise relationship between the harvesting units.

10. The multiple row cotton harvester according to claim 6 wherein each harvesting unit further includes an upper tension link for regulating the tilt of the harvesting unit, said tension link being pivotally connected to said lift arm and to said main frame to allow for vertical and horizontal movements of the harvesting unit.

11. A multiple row cotton harvester comprising:
a mobile main frame;

first and second cotton harvesting units, each harvesting unit defining a plant passage for receiving rows of cotton; and means for supporting said first and second harvesting units forwardly of the main frame in side-by-side lateral relation, said supporting means including first and second lift arms pivotally attached to said frame for vertical movement relative thereto, means for individually connecting said first and second harvesting units to said first and second lift arms, respectively, for independent angular displacement of said harvesting units, said connecting means including pivotal means for permitting pivotal movement of said first harvesting unit about a substantially vertical axis and in a generally lateral direction relative to said second harvesting unit to facilitate access between the harvesting units.

12. The multiple row cotton harvester according to claim 11 further including first and second drivers pivotally attached to said first and second lift arms, respectively, and to said frame for controlling angular displacement of said lift arms and thereby the vertical displacement of said harvesting units.

13. The multiple row cotton harvester according to claim 11 further including third and fourth harvesting units, said third harvesting unit being laterally arranged adjacent to said first harvesting unit and said fourth harvesting unit being arranged adjacent to said second harvesting unit, means for individually connecting said third and fourth harvesting units to said first and second lift arms, respectively, and wherein said means for connecting said third and fourth units to said lift arms each include pivotal means for allowing said third and fourth harvesting units to pivotally move laterally relative to an adjacent harvesting unit to facilitate access therebetween.

14. The multiple row cotton harvester according to claim 13 wherein each harvesting unit includes means for forcibly driving the respective harvesting units between first and second positions.

* * * * *